United States Patent [19]

Murase et al.

[11] Patent Number: 4,528,118
[45] Date of Patent: Jul. 9, 1985

[54] HIGHLY ELECTROCONDUCTIVE CONJUGATED POLYMER COMPOSITION AND PROCESS FOR PRODUCING THE SAME

[75] Inventors: Ichiki Murase, Ootsu; Toshihiro Ohnishi, Takatsuki; Takanobu Noguchi, Ootsu, all of Japan

[73] Assignee: Agency of Industrial Science and Technology, Tokyo, Japan

[21] Appl. No.: 602,534

[22] Filed: Apr. 20, 1984

[30] Foreign Application Priority Data

Apr. 28, 1983 [JP] Japan .................................. 58-74003
Jun. 30, 1983 [JP] Japan ................................ 58-117123

[51] Int. Cl.$^3$ .............................................. H01B 1/00
[52] U.S. Cl. .................................... 252/500; 252/512; 252/518; 524/401
[58] Field of Search ................ 524/401; 252/500, 518

[56] References Cited

U.S. PATENT DOCUMENTS 3,532,643 10/1970 Wessling et al. ...................... 521/63
3,706,677 12/1972 Wessling et al. ..................... 526/293

OTHER PUBLICATIONS

Polymer, vol. 20, 1979, pp. 1411, 1441–1443
J. Polymer Sci., Part A-1, vol. 6, 1968, pp. 1058–1061.

Primary Examiner—Josephine L. Barr
Attorney, Agent, or Firm—Stevens, Davis, Miller & Mosher

[57] ABSTRACT

A highly electroconductive conjugated polymer composition which comprises a polymer having as the principal constitutive unit thereof a conjugated polymer structure $-(R_1-CH=CH)_{\overline{m}}$, wherein m is an integer satisfying the equation $2 \leq m \leq n$, obtained by subjecting to elimination of sulfonium salt from the polyelectrolyte of sulfonium salt having the general formula

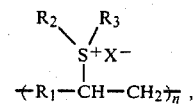

wherein $R_1$ represents a group which forms a consecutive carbon to carbon conjugated system together with the adjacent vinylene group formed by the dehydrogenation of the group $>CH-CH_2-$; $R_2$ and $R_3$ each represent a hydrocarbon radical having 1 to 20 carbon atoms; X represents a counter ion; and n represents an integer larger than 2, and a dopant.

20 Claims, No Drawings

HIGHLY ELECTROCONDUCTIVE CONJUGATED POLYMER COMPOSITION AND PROCESS FOR PRODUCING THE SAME

This invention relates to a highly electroconductive conjugated polymer composition having a high electroconductivity, a formed article thereof, and a process for producing a conjugated polymer used therein. More particularly, this invention relates to a highly electroconductive conjugated polymer composition which comprises a conjugated polymer obtainable from polyelectrolyte having sulfonium salt in side chain by subjecting it to elimination of the sulfonium salt and an electron acceptor or an electron donor (hereinafter referred to as dopant), a formed article thereof, and a process for producing the said conjugated polymer.

A conjugated polymer is in general an insulator or a semiconductor as it is, and usually does not give a high electroconductivity. In recent years, however, starting from the discovery that a metallic electroconductivity can be developed by doping of polyacetylene, attempts have been made to improve the electroconductivity of various conjugated polymers by doping them with a suitable electron acceptor or donor. But many of these conjugated polymer compounds are generally infusible and insoluble as they are, and are difficult to form into articles. This is a serious obstacle to the practical utilization of these compounds. Although some special conjugated polymer such as polyphenylacetylene is soluble in solvent, they do not give a sufficiently high electroconductivity even when doped with various sorts of dopants.

Thus, there has been known no conjugated polymer at all which can be processed into a desired form and can be given a high electroconductivity by doping. Such compounds have long been regarded as a dream of those in the art. Indeed, there has been known that acetylene can be polymerized into a polyacetylene film by means of a solution of polymerization catalyst poured in film-form and that a polypyrrole film can be formed on an electrode plate by the electrolytic polymerization of pyrrole. But, since the films thus obtained are insoluble and infusible, the resulting polymer cannot be processed freely into a desired form.

The present inventors made an extensive study for obtaining a conjugated polymer which can be processed into any desired form and further can be given a high electroconductivity by doping. As a result, it has been found that the object mentioned above can be achieved by means of a process which goes through a polymer intermediate having a good processability. This invention has been thus attained.

Polyphenylenevinylene is known already as a straight-chain conjugated polymer. It is also known publicly that polyphenylenevinylene may be doped with an electron acceptor, particularly a Lewis acid, to give an electroconductive polymer material. For example, when the polymer is doped with arsenic pentafluoride ($AsF_5$), an electron acceptor, it exhibits an electroconducitivity of 0.7 to 3 S/cm at the maximum [Polymer, 20, 1411 (1979)]. These polymers are those synthesized either by the Wittig reaction method (J. Amer. Chem. Soc., 82, 4669 (1960)] or a dehydrochlorination method (Makromol. Chem., 131, 105 (1970)]. The polymers obtained by the above methods of synthesis are all considered to have a polymerization degree of 10 or less and moreover are produced in the form of an insoluble and infusible powder. Accordingly, it is practically impossible to process the polymers into a film or a fiber form. Even with a special powder-molding technique, no useful formed article could be obtained.

On the other hand, it is already known from J. Polymer Sci., A-1, 6, 1058 (1968), U.S. Pat. Nos. 3,532,643 (1970) and 3,706,677 (1972) that a polyphenylenevinylene structure can be formed by a method of decomposing polyelectrolyte of sulfonium salt. But no information has been available as to the electroconductivity of the resulting product. It is to be noted here that the polyphenylenevinylene obtained according to the method known in the literature by decomposition of polyelectrolyte of sulfonium salt does not give as it is a high electroconductivity.

The present inventors investigated at first the cause of the low electroconductivity of polyphenylenevinylene obtained by the above-mentioned known method of sulfonium salt decomposition, and arrived at the conclusion that it was because oxidation occurred in the elimination of the sulfonium salt and in subsequent processes and hence the resulting conjugated system could not acquire a sufficient length to obtain an high electroconductivity. So that, the above treatment was then carried out with much care in an inert atmosphere and as a result it has been found out that the electroconductivity of the resulting product is markedly improved and, surprisingly, is higher than those of polyphenylenevinylenes synthesized by the Wittig method and the dehydrohalogenation method.

Even more important are the findings that a polyelectrolyte having sulfonium salt in side chain can be processed into any desired form and can be stretched to a high degree and that by subjecting the thus obtained highly oriented polyelectrolyte of sulfonium salt to elimination of the sulfonium salt and then doping the resulting product, a markedly high electroconductivity can be obtained.

Based on a number of these findings, there has been first discovered a process for obtaining a conjugated polymer which can be processed into any desired form and also can give a high electroconductivity. Also, it has been found that these easily processable, highly electroconductive conjugated polymer can be obtained not only for polyphenylenevinylene but through a wide variety of intermediate of polyelectrolyte having sulfonium salt in side chain. This invention has been accomplished on the basis of these findings.

An object of this invention is to provide a novel highly electroconductive conjugated polymer composition and process for producing the same.

Other objects and advantages of this invention will be apparent from the following descriptions.

Thus, according to the present invention, there are provided (1) a highly electroconductive conjugated polymer composition which comprises a polymer having as the principal constitutive unit thereof a conjugated polymer structure $+R_1-CH=CH+_m$, wherein m is an interger satisfying the equation $2 \leq m \leq n$, obtained by subjecting to elimination of sulfonium salt from polyelectrolyte of sulfonium salt having the general formula (I)

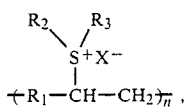

$$\begin{array}{c} R_2 \diagdown \diagup R_3 \\ S^+X^- \\ | \\ +R_1-CH-CH_2+_n \end{array} \quad (I)$$

wherein $R_1$ represents a group which forms a consecutive carbon to carbon conjugated system together with the adjacent vinylene group formed by the dehydrogenation of the group $>CH-CH_2-$; $R_2$ and $R_3$ each represents a hydrocarbon radical having 1 to 20 carbon atoms; X represents a counter ion; and n represents an integer larger than 2, and a dopant, (2) a process for producing a highly electroconductive conjugated polymer composition which comprises forming a formed article from a solution of the polyelectrolyte of sulfonium salt having the general formula (I), subjecting it to elimination of the sulfonium salt under an inert atmosphere, and then doping the resulting product, (3) a process for producing a conjugated polymer which comprises subjecting the polyelectrolyte of sulfonium salt having the general formula (I) to elimination of the sulfonium salt under an inert atmosphere.

The group $R_1$ in the general formula (I) is a group which forms, in a polymer having as the principal constitutive unit thereof $-R_1-CH=CH-_m$ obtained by elimination of the sulfonium salt, together with the adjacent $-CH=CH-$ group a consecutive carbon to carbon conjugated system to give a conjugated polymer. More specifically, it is a hydrocarbon radical or a radical derived therefrom having a structure which can be conjugated with a $-CH=CH-$ group derived from the $>CH-CH_2-$ group indicated in the general formula (I). Particularly preferable is a hydrocarbon radical having 2 to 20 carbon atoms or a derivative thereof.

Examples of these groups include aromatic monocyclic hydrocarbon radicals such as p-phenylene, alkyl-substituted p-phenylene (for example 2-ethyl-p-phenylene, 2,5-dimethyl-p-phenylene and the like), alkoxy-substituted p-phenylene (for example 2-methoxy-p-phenylene, 2,5-dimethoxy-p-phenylene, 2,5-diethoxy-p-phenylene and the like), and 4,4'-biphenylene; aromatic polycyclic hydrocarbon radicals such as 1,4-naphthylene, and 2,7-phenanthrylene; acyclic unsaturated hydrocarbon radicals such as vinylene, 1-methylvinylene, 1-phenylvinylene, and 1,4-butadienylene; and monocyclic unsaturated hydrocarbon radicals such as 1-cyclohexenylene and 1-cyclopentanylene.

For the purpose of this invention, particularly aromatic monocyclic hydrocarbon radicals such as p-phenylene, alkyl-substituted p-phenylene, alkoxy-substituted p-phenylene or 4,4'-biphenylene are preferred because they enable a stable production of the high molecular sulfonium salt.

More particularly preferred of these are p-phenylene, 2,5-dimethyl-p-phenylene and 2,5-dimethoxy-p-phenylene, which have groups symmetric to the principal chain axis.

Further, alkoxy-substituted p-phenylenes are highly preferred since they can yield an electroconductive material having an excellent stability against oxidation.

The groups $R_2$ and $R_3$ are each a hydrocarbon radical having 1 to 20 carbon atoms and include, for example, methyl, ethyl, propyl, isopropyl, n-butyl, 2-ethylhexyl, dodecyl, octadecyl, phenyl, cyclohexyl and benzyl groups. Those having 1 to 6 carbon atoms, particularly methyl and ethyl groups, are preferred.

The counter ion X of the sulfonic salt may be any of the conventionally used ions. For the purpose of this invention, there may be preferably used a halogen, hydroxyl group, boron tetrafluoride, perchlorate ion, and the like. Of these, halogens such as chlorine, bromine and iodine, and hydroxide ion are particularly preferred.

The polyelectrolyte of sulfonium salt used in this invention may be obtained by an optional method. For example, it can be obtained by subjecting a monomeric bis sulfonium salt obtained by a reaction with a dihalide, $X-CH_2-R_1-CH_2-X$, and sulfide to condensation polymerization by use of an alkali in water or a mixed solvent with water soluble organic solvent such as alcohols. Further, polyelectrolyte of sulfonium salt can also be obtained by carrying out the condensation co-polymerization similarly by use of an alkali in the presence of another kind of monomeric bis sulfonium salt.

The alkaline solution used in the condensation polymerization is preferably a strongly basic solution having a pH of 11 or more in water or in a mixed solvent of water and an organic solvent which does not react with the sulfonium salt, such as alcohols. Examples of alkalis which may be used include sodium hydroxide, potassium hydroxide, calcium hydroxide, quaternary ammonium salt hydroxide, sulfonium salt hydroxide, and strong basic ion exchange resin (OH—form). Sodium hydroxide, potassium hydroxide and a strongly basic ion exchange resin can be favorably used. In order to give a formed article having a high electroconductivity, the polyelectrolyte of sulfonium salt of this invention has preferably a sufficiently high molecular weight. Those in which n is at least 2, preferably at least 5 and which have a molecular weight such that the molecule does not pass through the membrane in dialysis using a membrane having a molecular cut-off level of 3500 are effectively used.

The present invention is features in that articles of any desired shape can be formed from the solution of the polyelectrolyte of sulfonium salt;

The polyelectrolyte of sulfonium salt according to this invention is sensitive to heat, light, ultraviolet light, strongly basic conditions and the like. It undergoes gradually elimination of the sulfonium salt, tends to become the polyelectrolyte of sulfonium salt having partly a conjugated structure $-R_1-CH=CH-$, resulting sometimes in a heterogeneous product in the solution. Accordingly, it is preferable to treat it rapidly at a relatively low temperature, namely not higher than 50° C. at the highest, in particular not higher than 25° C., and to use a homogeneous polyelectrolyte of sulfonium salt solution in processing it into a formed article.

An optional method may be used for obtaining polymer article from the polyelectrolyte of sulfonium salt. As to the shape of the products, polymer articles of any shape including film, fiber and coating adhered to substrate may be selected as desired.

Of particular importance is that an article wherein the molecules have been oriented by an optional method, such as stretching, can acquire a particularly high electroconductivity by doping. Accordingly, a film- or fiber-formed article which can be easily stretched gives a good result. Film-forming or spinning can be performed by any of the conventional methods including coating or solution spinning. Thus, a particularly useful method of forming is casting or solution spinning by use of a synthesis aqueous solution of the sulfonium salt or a solution thereof in other medium. It is preferable in this instance to use a solution of the polyelectrolyte of sulfonium salt which has been desalted or freed from the unreacted substances by means of dialysis or the like beforehand.

The elimination of the sulfonium salt from the polyelectrolyte can be effected by treating it with heat, light, ultraviolet light, a strong base, or the like, but heat treatment is preferred. For obtaining a highly electroconductive composition, it is important to perform the elimination of the sulfonium salt from polyelectrolyte of sulfonium salt under an inert atmosphere. The "inert atmosphere" herein refers to an atmosphere which does not cause deterioration of the polymer film during the elimination treatment. It is important to prevent particularly the oxidation caused by oxygen or air. The treatment is carried out generally in an inert gas such as nitrogen, argon and helium, but it may also be carried out in an inert medium, or under vacuum after flushing the system with an inert gas.

The heat-treatment temperature suited for carrying out the elimination of the sulfonium salt is, though it depends upon the kind of polyelectrolyte of sulfonium salt, generally 0° to 400° C., and preferably 50° to 350° C. Most preferred is a temperature of 100° to 300° C.

One of the features of this invention is that the formed articles thereof can be oriented. Although orientation can be effected also by a clever method of forming, for example by extrusion under a high shearing force, a high degree of orientation can be obtained by stretching an article formed from a solution of polyelectrolyte of the sulfonium salt. The temperature of stretching for orientation may be optionally chosen within the temperature range for heat treatment, taking the kind of the polyelectrolyte of sulfonium salt used into consideration.

The stretching and orientation can be effected either by performing the elimination of the sulfonium salt and the orientation by stretching or the like simultaneously or by performing the orientation prior to the elimination of the sulfonium salt, although the former procedure is more practical.

It has been found out surprisingly that by the above procedure performed at a properly selected temperature, several to ten-odd fold stretching is possible. The method of stretching which can be used include uniaxial stretching, biaxial stretching, and rolling. This orientation is a very important procedure for obtaining a high electroconductivity.

It can be observed that the regularity of molecular alignment and the crystallinity are improved by the orientation treatment.

Furthermore, it has been found out that the conjugated polymer for its object to give a high electroconductivity in the present invention should not necessarily be formed completely of conjugated recurring units, though a completely conjugated system is preferred.

Thus, it has been found out surprisingly that even when sulfonium salt remains in an amount of 7% by weight or less, more preferably 4% by weight or less in terms of sulfur based on the analytical value of sulfur obtained in the elementary analysis performed after heat treatment and annealing, it is possible to give to the product a high electroconductivity by subsequent doping and to obtain a flexible formed composition moreover. In this instance, most of the remaining sulfur exists as an alkyl thioether group in side chains as the result of a side reaction occurring in elimination of the sulfonium salt.

Next, a description will be made of the highly electroconductive conjugated polymer composition according to this invention which comprises a polymer obtained by elimination of sulfonium salt and an electron acceptor or an electron donor which gives high electroconductivity to the polymer. As the electron acceptor or the electron donor, there may be effectively used those compounds which have been found to be effective in improving the electroconductivity in doping a prior electroconductive polymer such as polyacetylene and in forming an interlayer compound of graphite.

The composition of this invention can be obtained by an optional method, but is it preferable to perform the doping by a conventional known technique as chemical doping, electrochemical doping, light doping, and ion implantation.

Specific examples of the electron acceptor in chemical doping are:

halogen compounds: fluorine, chlorine, bromine, iodine, iodine chloride, iodine trichloride, iodine bromide, iodine pentafluoride;

Lewis acids: phosphoric pentafluoride, arsenic pentafluoride, antimony pentafluoride, boron trifluoride, boron trichloride, boron tribromide, sulfur trioxide;

protonic acids: hydrogen fluoride, hydrogen chloride, nitric acid, sulfuric acid, perchloric acid, fluorosulfonic acid, chlorosulfonic acid, trifluoromethanesulfonic acid;

transition metal chlorides: titanium tetrachloride, zirconium tetrachloride, hafnium tetrachloride, niobium pentachloride, tantalum pentachloride, molybdenum pentachloride, tungsten hexachloride, ferric chloride;

organic compounds: tetracyanoethylene, tetracycnoquinodimethane, chloranil, dichlorodicyanobenzoquinone.

Specific examples of the electron donor in chemical doping are:

alkali metals: lithium, sodium, potassium, rubidium, cesium.

The preferable content of the these doping agents varies depending on the kind of the doping agent, and can be further varied as desired depending on the doping conditions such as doping time and concentration of the doping agent. A generally preferable content is 0.01 to 0.3 mole of the dopant relative to the =CH— unit participating in the conjugated system. At a too low content, a high electroconductivity cannot be obtained. A too high concentration is uneconomical because the electroconductivity tends to level off.

Particularly, an effective dopant in chemical doping is electron acceptors.

Of these acceptors, sulfurtrioxide, fuming sulfuric acid, iodine and arsenic pentafluoride ($AsF_5$) may be specially mentioned as an effective doping agent.

Examples of anionic dopant species to be used in electrochemical doping are:

anions of halogen compounds: $PF_6^-$, $SbF_6^-$, $AsF_6^-$, $I^-$, $Br^-$, $Cl^-$, $I_3^-$, $BF_4^-$, $AlCl_4^-$;

perchlorate anion: $ClO_4^-$;

others: $SO_4^{--}$, $CH_3SO_4^-$;

Examples of cationic dopant species are:

cations of alkali metals: $Li^+$, $Na^+$, $K^+$, $Rb^+$;

cations of organic salts: $R_4N^+$, $R_4P^+$, $R_3S^+$, $R_3O^+$ (R is an alkyl group having 1 to 10 carbon atoms).

There may be used in practice as an electrolyte, a salt formed of the said anionic dopant species and the said cationic dopant species. Specific examples of such salts include $LiPF_6$, $LiSbF_6$, $LiAsF_6$, $LiClO_4$, $NaI$, $NaPF_6$, $NaSbF_6$, $NaAsF_6$, $NaClO_4$, $KI$, $KPF_6$, $KSbF_5$, $KAsF_6$, $KClO_4$, $[(n-Bu)_4N^{30}](AsF_6^-)$, $[(n-Bu)_4N^+](PF_6^-)$, and $[(n-Bu)_4N^+](ClO_4^-)$. These dopants can also be used as mixtures of two or more thereof.

As to the solvent for electrolytic solution in electrochemical doping there is no specific restriction, and water or organic solvents can be used. But an aprotic organic solvent having a high dielectric constant is preferably used. Examples of such solvents include propylene carbonate, tetrahydrofuran, sulfolane, 3-methylsulfolane, dichloroethane, γ-butyrolactone, dimethylsulfoxide, dimethylformamide, dimethylacetamide, acetonitrile, and nitromethane, but are not limited to these. These organic solvents may be used either alone or in a mixture of two or more thereof. These solvents are preferably subjected to dehydration and deoxygenation prior to use. The electrolyte concentration in the electrolytic solution is not restricted specifically. Though it varies depending upon the kind of electrolyte and solvent to be used, the preferred concentration is usually 0.001 to 10 mol/l and more preferably 0.01 to 2 mol/l.

There is no specific restriction as to these methods of electrochemical doping. Known methods described in J. Chem. Soc. Faraday Trans. I, 78, 3417 (1982) or J. Chem. Soc. Chem. Commun., 1982, 361 may be used. Either of a constant current method, a constant potential method, or a method in which current and potential are not controlled may be used. When the conjugated high molecular compound imediately after synthesis has an extremely low electroconductivity and hence is difficultly doped electrochemically, the electrochemical doping may be performed after increasing the electroconductivity of the compound by a small amount of preliminary chemical doping.

The composition of this invention can give an electroconductivity of $10^{-3}$ to 10 S/cm or higher even in an unoriented formed composition; especially when arsenic pentafluoride ($AsF_5$) is used, a conductivity of 10 S/cm or higher may be obtained. In a highly oriented formed article, an electroconductivity of 100 S/cm or higher, sometimes $10^3$ S/cm or higher can be obtained.

The uniaxially oriented composition then comes to exhibit electric anisotropy. The anisotropy in the stretching direction can be made 10 times or more that in the lateral direction.

In order to obtain a high electroconductivity, it is necessary to perform the elimination of sulfonium salt under an inert atmosphere and the operation of forming the composition with the doping agent and it is preferred particularly to use an oriented polymer. Further, for obtaining a flexible composition, the use of a polymer that contains some residual sulfur component after elimination of sulfonium group gives good result.

The composition comprising a conjugated polymer and a doping agent according to this invention can be applied in a variety of electrical and electronic materials utilizing its electroconductivity.

This invention is further illustrated in detail with reference to Examples, but the invention is in no way limited thereto.

EXAMPLE 1

Into a solution of 4.4 g of p-xylylenebis(diethylsulfonium bromide) in 50 ml distilled water was added dropwise over a period of 15 minutes an aqueous solution which has been prepared beforehand by dissolving 0.8 g of sodium hydroxide in 50 ml of distilled water, and the mixture was stirred for 3 hours at 0° C. to 5° C. After the reaction, the mixture was neutralized with 0.66N aqueous hydrogen bromide solution.

The resulting reaction solution was dialyzed for 2 days against deionized water by using, a membrane of cellulose tube, (molecular weight cut-off level: 3500). The dialyzed solution was cast and dried at 30° C. or below under reduced pressure to yield a light greenish yellow film, 10 μm in thickness, of the polyelectrolyte having sulfonium salt in side chains.

The film (5 cm in length and 10 cm in width) was subjected to a stationary heat-treatment at 200° C. for 2 hours under nitrogen atmosphere by using a horizontal tube furnace. The resulting film had an electroconductivity of $10^{-10}$ S/cm or less. The film was subjected in a conventional manner to doping from vapor phase at room temperature by using sulfur trioxide as the electron accepting compound. The resulting composition showed an electroconductivity of 0.85 S/cm after 24 hours and 1.20 S/cm after 72 hours of doping.

On the other hand, when the film was heat-treated at 200° C. for 2 hours in air without nitrogen flushing and then doped with sulfur trioxide, the resulting film showed only an electroconductivity of $1.0 \times 10^{-4}$ S/cm after 24 hours and $5 \times 10^{-4}$ S/cm after 72 hours.

The determination of electroconductivity was conducted by a four-probe technique or a two-probe technique.

When infrared spectrum was determined on film samples which has been heat-treated in air at 200° C. or above, an absorption was observed in the vicinity of 1690 $cm^{-1}$ for all of the samples which was considered to originate from a carbonyl group. In the case of films heat-treated in nitrogen, no absorption was observed at all.

EXAMPLE 2

A film of the polyelectrolyte of sulfonium salt obtained by the method as described in Example 1 was heat-treated at a predetermined temperature under nitrogen atmosphere, and subsequently subjected to vaporphase doping with sulfur trioxide for 48 hours to give a highly electroconductive polymer film composition. The results obtained are as shown in Table 1.

TABLE

| Run No. | Temp. (°C.) | Heating time (hr) | Elementary analysis | | | Electroconductivity (S/cm) |
|---|---|---|---|---|---|---|
| | | | C | H | S | |
| 1 | 200 | 0.25 | 89.0 | 6.2 | 4.4 | 0.34 |
| 2 | 300 | 0.5 | 93.7 | 6.1 | Not detected | 1.00 |
| Theoretical value | | | 94.1 | 5.9 | | |

The film treated at 200° C. for 15 minutes contained 4.4% of sulfur, which showed that the elimination of sulfonium salts had not gone into completion, had an excellent flexibility and showed a high electroconductivity already. In the film heat-treated at 300° C. for 30 minutes, no sulfur was detected, which showed the substantial completion of elimination of sulfonium salts, and a further increase in electroconductivity was observed. But the film had a poor flexibility.

EXAMPLE 3

Into 50 ml of distilled water was dissolved 4.4 g of p-xylylenebis(diethylsulfonium bromide) and the resulting solution was cooled down to 3° C.

Into the above solution, was added gradually over a period of 10 minutes a strongly basic ion exchange resin [Amberlite ® IRA-401] which had been converted into the OH—form in an amount corresponding to 4 equivalents relative to the p-xylylenebis(diethylsulfonium bromide) used, and the mixture was stirred for 3 hours at 0° to 5° C. After the reaction, the mixture was filtered to remove the ion exchange resin.

The filtrate obtained was dialyzed in the same manner as described in Example 1. The dialyzed solution was cast and dried under reduced pressure at 30° C. or below to give a film of the polyelectrolyte of sulfonium salt.

The film was heat-treated at 200° C. under nitrogen atmosphere to give a film having a thickness of 7 $\mu$m. The film thus obtained was subjected in a conventional manner to vapor-phase doping for 24 hours at room temperature under a predetermined pressure with iodine ($I_2$), sulfur trioxide ($SO_3$) or arsenic pentafluoride ($AsF_5$) used as an electron accepting compound. Thirty-percent fuming sulfuric acid was used as the generating source of $SO_3$.

The results of electroconductivity determination are as shown in Table 2. Separately, a polyphenylenevinylene in powder form synthesized by a known method was press-molded into pellet form (thickness 70 $\mu$m), and then subjected to doping in the same conditions as mentioned above. The results of determination made on this sample were shown as Comparative Example.

TABLE 2

| Synthesis method | Form | Electroconductivity (S/cm) | | | |
|---|---|---|---|---|---|
| | | Untreated | $I_2$ | $SO_3$*1 | $AsF_5$*1 |
| This invention | Transparent yellow film | $7.0 \times 10^{-11}$ | $4.3 \times 10^{-4}$ | 0.85 | 15 |
| Comparative example | | | | | |
| Wittig reaction*2 | Yellow powder | $5.5 \times 10^{-15}$ | $3.8 \times 10^{-9}$ | — | 1.3 |
| Dehydrochlorination*3 | Yellow powder | $2.3 \times 10^{-16}$ | $3.7 \times 10^{-7}$ | $6.4 \times 10^{-6}$ | 0.75 |

Note:
*1Predetermined pressure: $SO_3$ 5 Torr, $AsF_5$ 300 Torr
*2According to the method described in Polymer, 20, 1411 (1979)
*3According to the method described in Makromol. Chem., 131, 105 (1970)

EXAMPLE 4

The dialyzed solution obtained in Example 1 was cast on a polypropylene film and dried for 24 hours at 30° C. under reduced pressure to give a film of polyelectrolyte of sulfonium salt having a thickness of 20 $\mu$m. The film was peeled off from the substrate, cut to a size of 5 cm in length and 2 cm in width. The cut out film was fixed on a stretching machine by fastening its both ends with clamps. After replacing the atmosphere in the system with nitrogen, the film was heated at constant length under a stream of nitrogen up to 100° C., heated further up to 150° C. while being uniaxially stretched at a stretching velocity of 10 mm/min., and then annealed at constant length at 200° C. for 30 minutes to give a film stretched 10.8-fold. These specimens were subjected to vapor phase doping for 24 hours at room temperature with 30% fuming sulfuric acid used as the generating source of sulfur trioxide to give an electroconductivity of 491 S/cm.

EXAMPLE 5

The film of polyelectrolyte of sulfonium salt obtained in Example 4 was cut into a size of 4 cm in length and 2 cm in width. The cut out film was fixed on a stretching machine by fastening its both ends with clamps. The film was heated at constant length under a stream of nitrogen up to 120° C., heated further up to 160° C. while being uniaxially stretched at a film stretching velocity of 15 mm/min. to give a film stretched 8-fold. The stretched film was annealed at constant length for 30 minutes at 200° C. to give a film of 7 $\mu$m in thickness. The film thus stretched was subjected in a conventional manner to vapor phase doping at room temperature under a pressure of 350 Torr with arsenic pentafluoride used as the electron acceptor to give an electroconductivity of 2790 S/cm.

EXAMPLE 6

The dialyzed solution obtained in Example 1 was extruded slowly through a nozzle 2 mm in diameter into 50% aqueous sodium hydroxide solution to form a filament. The resulting filament was stretched at 150° C. and then annealed for 1 hour at 200° C. to give a 6-fold stretched filament.

The filament was doped in a conventional manner for 24 hours with sulfur trioxide to give a filament having an electroconductivity of 327 S/cm.

EXAMPLE 7

Into 50 ml of distilled water was dissolved 4.7 g of 2,5-dimethyl-p-xylylenebis(diethylsulfonium bromide), and the solution was cooled down to 3° C.

Into the solution was then added dropwise an aqueous solution which had been prepared beforehand by dissolving 0.8 g of sodium hydroxide in 50 ml of distilled water, and the mixture was stirred for 2 hours at 0° C. to 5° C. After the reaction, the mixture was neutralized with 0.6N aqueous hydrogen bromide. This reaction solution was dialyzed against deionized water by use of a membrane of cellulose tube (cut-off molecular weight 20,000). The dialyzed solution was cast, and dried at 30° C. for 24 hours under reduced pressure to give an orange-yellow film of 8 $\mu$m in thickness. A part of this film, 5 cm in length and 1 cm in width, was subjected to stationary heat-treatment at 200° C. for 2 hours under an atmosphere of argon gas.

The film was then subjected to an electrochemical doping in acetonitrile with lithium perchlorate used as the electrolyte. The film thus obtained had a glossy black color and exhibited an electroconductivity of $2.5 \times 10^{31}$ 2 S/cm.

EXAMPLE 8

Into 50 ml of deionized water was dissolved 3.6 g of 2,5-dimethoxy-p-xylylenebis(dimethylsulfonium bromide). Into the solution was added dropwise 50 ml of 0.3N aqueous sodium hydroxide solution at 0° to 5° C. over a period of 15 minutes. After completion of the dropwise addition, stirring was continued for 30 minutes at 0° to 5° C. After the reaction, the mixture was neutralized with 0.77N aqueous hydrogen bromide solution. The reaction solution obtained was dialyzed for one day against deionized water by use of a membrane of cellulose tube (cut-off molecular weight: 8000).

The dialyzed solution was cast and then dried at 40° C. or below under reduced pressure to give a film, 3 μm in thickness, of polyelectrolyte of sulfonium salt having the sulfonium salts in side chains.

The film (5 cm in length and 3 cm in width) was subjected to stationary heat-treatment at 200° C. for 30 minutes under nitrogen atmosphere by using a horizontal tube furnace to give a red, film of poly(2,5-dimethoxyphenylenevinylene).

The above structure was confirmed by the coincidence of the result of elementary analysis and the characteristic absorption in infrared spectrum with those of a specimen obtained by dehydrohalogenation.

The film was further subjected to vapor phase doping in a conventional manner at room temperature with iodine used as the electron accepting compound to exhibit an electroconductivity of 155 S/cm after 18 hours. When the film was allowed to stand in air for 4 days after the doping, it showed an electroconductivity of 11 S/cm.

A remarkable finding to be mentioned here is that the electroconductivity of poly(alkoxy-substituted-p-phenylenevinylene) thus obtained or of a copolymer constituted mainly of the structural unit is far more markedly improved by doping than that of poly(p-phenylenevinylene) having no substituent is. The reason for this is considered that the ionization potential of the polymer is lowered by incorporation of the alkoxy group, an electron donating group, into the conjugated polymer and thus the complexing of these polymer with a dopant is facilitated.

EXAMPLE 9

The film of poly(2,5-dimethoxy-p-phenylenevinylene) obtained in Example 8 was doped by using 30% fuming sulfuric acid used as the generating source of sulfuric acid anhydride. The resulting film had an electroconductivity of 10.3 S/cm.

EXAMPLE 10

A film of the polyelectrolyte of sulfonium salt obtained by the method described in Example 8 was heated at 200° C. for 30 minutes under nitrogen atmosphere. The resulting film was subjected to electrochemical doping by using 0.5N lithium perchlorate/propylenecarbonate solution as electrolytic solution. The obtained film had a glossy black color and an electroconductivity of 53 S/cm.

EXAMPLE 11

Into 50 ml of a solvent mixture of distilled water and ethanol (1:2 by weight) was dissolved 1.5 g of 2,5-diethoxy-p-xylylenebis(diethylsulfonium bromide), and the solution was cooled to 0° C. Into the above solution, was added gradually over a period of 10 minutes a strongly basic ion exchange resin (Amberlite® IRA-401) which had been converted into the OH—form in an amount corresponding to two times the amount of the monomeric bis sulfonium salt used, and the mixture was stirred for 100 minutes at 0° to 5° C.

After the reaction the ion exchange resin was removed by filtration, and the filtrate was dialyzed against deionized water at 0° C. to 5° C. by using a membrane of cellulose tube (cut-off molecular weight: 3500). The dialyzed solution was cast into film and dried at 30° C. for 24 hours under reduced pressure.

The film of the high molecular sulfonium salt obtained was subjected to heating and stretching up to 200° C. under a nitrogen atmosphere to give a stretched film of poly(2,5-diethoxy-p-phenylenevinylene) stretched 2-fold.

The film was doped in a conventional manner with iodine. The resulting 2-fold stretched film showed an electroconductivity of 71 S/cm.

What is claimed is:

1. A highly electroconductive conjugated polymer composition which comprises a polymer having as the principal constitutive unit thereof a conjugated polymer structure $+R_1-CH=CH+_m$, wherein m is an integer satisfying the equation $2 \leq m \leq n$, obtained by subjecting to elimination in an inert atmosphere, sulfonium salt from a polyelectrolyte of sulfonium salt having the general formula (I)

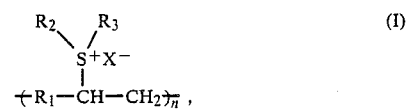

wherein $R_1$ represents a group which forms a consecutive carbon to carbon conjugated system together with the adjacent vinylene group formed by the dehydrogenation of the group $>CH-CH_2-$; $R_2$ and $R_3$ each represents a hydrocarbon radical having 1 to 20 carbon atoms; X represents a counter ion; and n represents an integer larger than 2, and a dopant.

2. A highly electroconductive conjugated polymer composition according to claim 1, wherein $R_1$ in the general formula (I) is an aromatic monocyclic hydrocarbon radical, an aromatic polycyclic hydrocarbon radical, an acyclic unsaturated hydrocarbon radical, or a monocyclic unsaturated hydrocarbon radical.

3. A highly electroconductive conjugated polymer composition according to claim 1, wherein $R_1$ in the general formula (I) is an aromatic monocyclic hydrocarbon radical.

4. A highly electroconductive conjugated polymer composition according to claim 1, wherein $R_1$ in the general formula (I) is p-phenylene, an alkyl-substituted p-phenylene, or an alkoxy-substituted p-phenylene.

5. A highly electroconductive conjugated polymer composition according to claim 1, wherein $R_1$ in the general formula (I) is p-phenylene.

6. A highly electroconductive conjugated polymer composition according to claim 1, wherein $R_1$ in the general formula (I) is an alkoxy-substituted p-phenyelne.

7. A highly electroconductive conjugated polymer composition according to claim 1, wherein $R_2$ and $R_3$ in the general formula (I) are each a methyl or ethyl group.

8. A highly electroconductive conjugated polymer composition according to claim 1, wherein the counter ion X in the general formula (I) is a halogen atom or a hydroxide ion.

9. A highly electroconductive conjugated polymer composition according to claim 1, wherein the polyelectrolyte of sulfonium salt is formed into an optional desired article and then subjected to elimination of the sulfonium salt.

10. A highly electroconductive conjugated polymer composition according to claim 9, wherein the formed article is a film, a fiber or a coating.

11. A highly electroconductive conjugated polymer composition according to claim 1, wherein a polymer obtained by elimination of sulfonium salt is in the form of an oriented formed article.

12. A highly electroconductive conjugated polymer composition according to claim 11, wherein the oriented formed article is a film or a fiber.

13. A highly electroconductive conjugated polymer composition according to claim 1, wherein the dopant of chemical doping is electron acceptor.

14. A highly electroconductive conjugated polymer composition according to claim 1, wherein the dopant is sulfur trioxide, iodine, or arsenic pentafluoride.

15. A process for producing a highly electroconductive conjugated polymer composition which comprises forming a formed article from a solution of a polyelectrolyte of sulfonium salt having the general formula

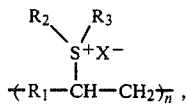

wherein $R_1$ represents a group which forms a consecutive carbon to carbon conjugated system together with the adjacent vinylene group formed by the dehydrogenation of the group $>CH-CH_2-$; $R_2$ and $R_3$ each represents a hydrocarbon radical having 1 to 20 carbon atoms; X represents a counter ion; and n represents an integer larger than 2, subjecting it to elimination of the sulfonium salt in an inert atmosphere, and doping the resulting product.

16. A process for producing a conjugated polymer which comprises subjecting a high molecular sulfonium salt having the general formula

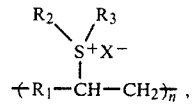

wherein $R_1$ represents a group which forms a consecutive carbon to carbon conjugated system together with the adjacent vinylene group formed by the dehydrogenation of the group $>CH-CH_2-$; $R_2$ and $R_3$ each represents a hydrocarbon radical having 1 to 20 carbon atoms; X represents a counter ion; and n represents an integer larger than 2, to elimination of the sulfonium salt in an inert atmosphere.

17. A highly electroconductive conjugated polymer composition according to claim 9, wherein a polymer obtained by elimination of sulfonium salt is in the form of an oriented formed article.

18. A highly electroconductive conjugated polymer composition according to claim 17, wherein the oriented formed article is a film or a fiber.

19. A highly electroconductive conjugated polymer composition according to claim 1, wherein $R_1$ in the general formula (I) is 2,5-di-methoxy-p-phenylene or 2,5-diethoxy-p-phenylene.

20. A highly electroconductive conjugated polymer composition according to claim 11, wherein a polymer in the form of an oriented formed article is obtained by performing the elimination of the sulfonium salt and the orientation by stretching, simultaneously.

* * * * *